US012416765B2

(12) United States Patent
Nakamura et al.

(10) Patent No.: US 12,416,765 B2
(45) Date of Patent: Sep. 16, 2025

(54) FERRULE, OPTICAL CONNECTOR, AND OPTICAL CONNECTOR MODULE

(71) Applicant: Enplas Corporation, Saitama (JP)

(72) Inventors: Masato Nakamura, Saitama (JP); Yuto Kujirai, Saitama (JP); Ayano Hinata, Saitama (JP)

(73) Assignee: Enplas Corporation, Saitama (JP)

( * ) Notice: Subject to any disclaimer, the term of this patent is extended or adjusted under 35 U.S.C. 154(b) by 314 days.

(21) Appl. No.: 18/182,279

(22) Filed: Mar. 10, 2023

(65) Prior Publication Data

US 2023/0296849 A1    Sep. 21, 2023

(30) Foreign Application Priority Data

Mar. 16, 2022  (JP) ................. 2022-041462

(51) Int. Cl.
*G02B 6/38* (2006.01)
*G02B 6/36* (2006.01)

(52) U.S. Cl.
CPC .......... *G02B 6/381* (2013.01); *G02B 6/3636* (2013.01)

(58) Field of Classification Search
None
See application file for complete search history.

(56) References Cited

U.S. PATENT DOCUMENTS

| | | | | |
|---|---|---|---|---|
| 8,641,296 | B2* | 2/2014 | Nishimura | G02B 6/4214 385/33 |
| 9,638,870 | B2* | 5/2017 | Chang | G02B 6/3853 |
| 9,684,137 | B2* | 6/2017 | Watanabe | G02B 6/3861 |
| 10,215,928 | B2* | 2/2019 | Howard | G02B 6/4292 |
| 10,948,665 | B2* | 3/2021 | Koumans | G02B 6/425 |
| 11,726,268 | B1* | 8/2023 | Sukegawa | G02B 6/3885 385/83 |
| 2001/0036341 | A1* | 11/2001 | Ohtsuka | G02B 6/25 385/85 |
| 2010/0158450 | A1* | 6/2010 | Koreeda | G02B 6/3888 385/87 |
| 2014/0178011 | A1* | 6/2014 | Chang | G02B 6/4214 385/79 |
| 2019/0079253 | A1 | 3/2019 | Koumans | |
| 2023/0266540 | A1* | 8/2023 | Hinata | G02B 6/3885 385/78 |

* cited by examiner

*Primary Examiner* — Jerry Rahll
(74) *Attorney, Agent, or Firm* — Shih IP Law Group, PLLC

(57) ABSTRACT

A ferrule includes a holding part, a first surface and a second surface. The holding part includes a first holding recess including the first surface and a third surface facing the first surface, a first wall, at least one through hole that is open at the third surface and a fourth surface, the fourth surface being located on a side on which the plurality of optical transmission members is inserted, and a plurality of first grooves disposed at the first holding recess along an extending direction of the plurality of optical transmission members, the plurality of optical transmission members inserted to the at least one through hole is respectively disposed at the plurality of first grooves.

9 Claims, 9 Drawing Sheets

FERRULE, OPTICAL CONNECTOR, AND OPTICAL CONNECTOR MODULE

This application is entitled to the benefit of Japanese Patent Application No. 2022-041462, filed on Mar. 16, 2022, the disclosure of which including the specification, drawings and abstract is incorporated herein by reference in its entirety.

TECHNICAL FIELD

The present invention relates to a ferrule for holding an optical transmission member, an optical connector and an optical connector module.

BACKGROUND ART

In the related art, optical transmission members such as optical fibers and optical waveguides are used for optical communications. In the state where the front end is held by a ferrule, an optical transmission member is optically connected to another optical component and another optical transmission member (see, for example, PTL 1).

PTL 1 discloses a base (ferrule) including a light coupling part including a plurality of optical surfaces and serving as a light path between a coupling element and an optical fiber, a fiber holding part, and a fiber supporting part. The fiber holding part includes a V-groove and a fiber holding cover, and holds one end portion of the optical fiber. The fiber supporting part includes a recess and a cover, and supports the optical fiber such that the optical fiber is not bent.

The base disclosed in PTL 1 fixes the optical fiber by pushing the optical fiber to the V-groove from the upper side with the fiber holding cover, and then pressing the optical fiber to the recess from the upper side with the cover.

CITATION LIST

Patent Literature

PTL 1
US Patent Application Publication No. 2019/0079253

SUMMARY OF INVENTION

Technical Problem

However, in the base (ferrule) disclosed in PTL 1 and the like, the clearance between the V-groove and the fiber is small, and consequently it is difficult to correctly dispose the fiber to the V-groove.

An object of the present invention is to provide a ferrule that can accurately position the front end of an optical transmission member, and is easy to assemble. In addition, another object of the present invention is to provide an optical connector and an optical connector module including the ferrule.

Solution to Problem

A ferrule according to an embodiment of the present invention is configured to hold a plurality of optical transmission members, the ferrule including: a holding part configured to hold one end portion of the plurality of optical transmission members; a first surface configured to allow, to enter the ferrule, light emitted from the plurality of optical transmission members held by the holding part, or configured to emit, toward the plurality of optical transmission members, light advanced inside the ferrule; and a second surface configured to emit, to outside of the ferrule, the light advanced inside the ferrule, or configured to allow, to enter the ferrule, light from the outside. The holding part includes: a first holding recess including the first surface and a third surface facing the first surface, at least one through hole that is open at the third surface and a fourth surface, the fourth surface being located on a side on which the plurality of optical transmission members is inserted, and a plurality of first grooves disposed at the first holding recess along an extending direction of the plurality of optical transmission members, the plurality of optical transmission members inserted to the at least one through hole is respectively disposed at the plurality of first grooves.

An optical connector according to an embodiment of the present invention includes the ferrule; and a plurality of optical transmission members held by the ferrule.

An optical connector module according to an embodiment of the present invention includes an optical connector of an embodiment of the present invention.

Advantageous Effects of Invention

According to the present invention, a ferrule that can accurately set the position of the end of the optical transmission member and is easy to assemble can be provided.

DESCRIPTION OF EMBODIMENTS

A ferrule, an optical connector and an optical connector module according to an embodiment of the present invention are elaborated below with reference to the accompanying drawings.

Embodiment 1

Configuration of Optical Connector

Figure 1:
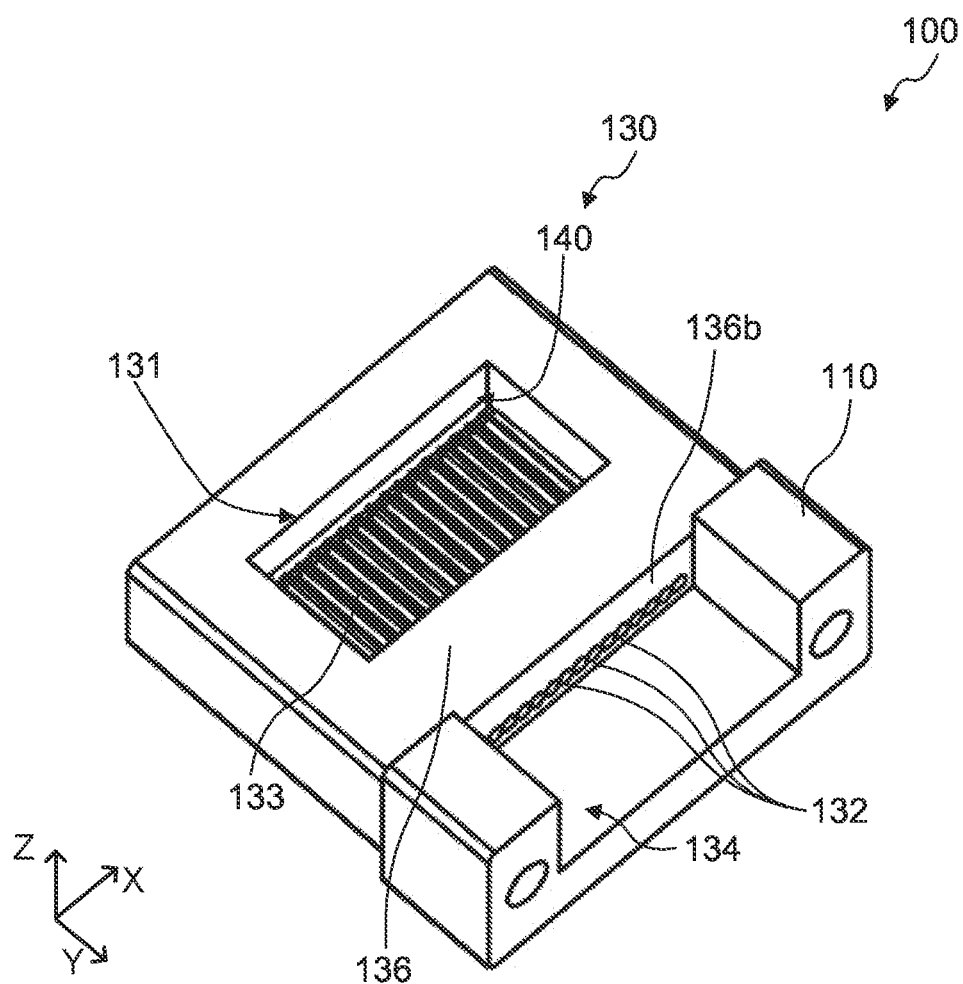
FIG. 1 is a perspective view of an optical connector according to Embodiment 1 of the present invention.
Figure 2A:
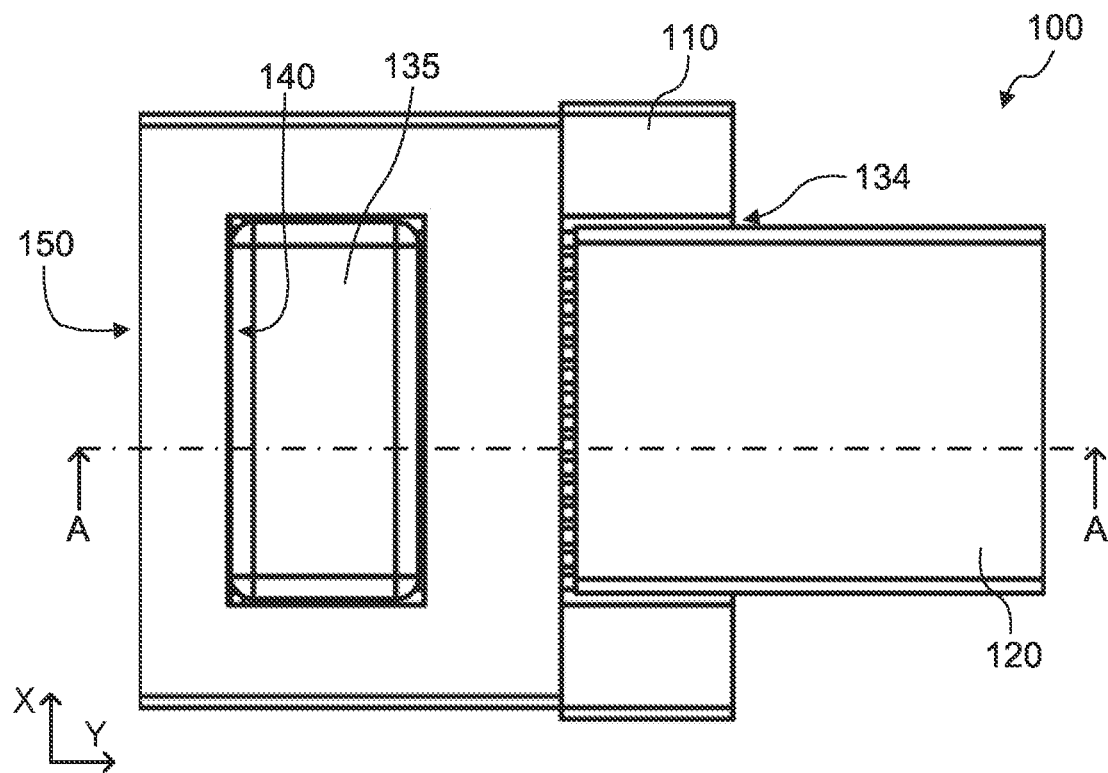
FIGS. 2A and 2B illustrate a configuration of the optical connector according to Embodiment 1 of the present invention.
Figure 2B:
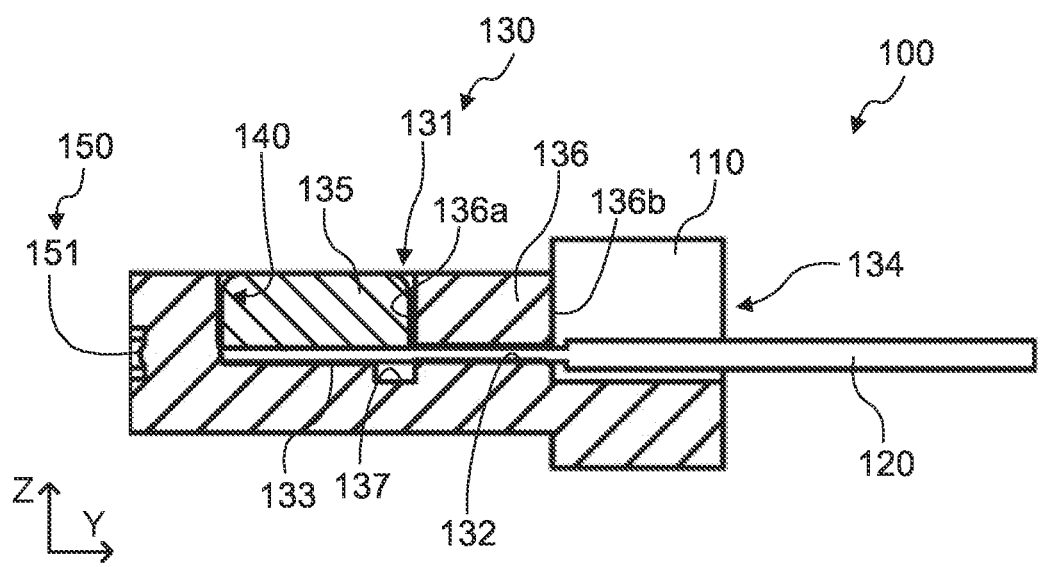

FIG. 1 is a perspective view of optical connector 100 according to Embodiment 1 of the present invention. FIG. 2A is a plan view of optical connector 100, and FIG. 2B is a sectional view taken along line A-A illustrated in FIG. 2A. Note that pressing member 135 and optical transmission member 120 are omitted in FIG. 1, and optical transmission member 120 is illustrated with the solid line in FIGS. 2A and 2B.

Note that in the following description, the direction in which optical transmission members 120 are disposed in parallel (the direction in which projecting surfaces 151 of second surface 150 are arranged) is "first direction" or "X direction", the direction (height direction) orthogonal to the X direction in front view of second surface 150 is "second direction" or "Z direction", and the direction orthogonal to the X direction and the Z direction is "third direction" or "Y direction".

As illustrated in FIGS. 1, 2A and 2B, optical connector 100 according to Embodiment 1 includes ferrule 110 and a plurality of optical transmission members 120. Optical connector 100 according to the present embodiment can be used as an optical connector module together with a housing, a spring clamp structure part and the like.

The type of optical transmission member 120 is not limited. Examples of the type of optical transmission member 120 include optical fibers and optical waveguides. In the present embodiment, optical transmission member 120 is an optical fiber. In addition, the optical fiber may be of a single mode type, or a multiple mode type. Preferably, the end surface of optical transmission member 120 is tilted with respect to the plane orthogonal to the extending direction of optical transmission member 120. In the present embodiment, the inclination angle to the plane is 5 degrees. The number of optical transmission members 120 is not limited as long as a plurality of optical transmission members 120 is provided. In the present embodiment, the number of optical transmission members 120 is 14. The end portion of optical transmission member 120 is held by ferrule 110.

Ferrule 110 is a member with a substantially cuboid shape, and holds the front end portion of optical transmission member 120. Ferrule 110 includes holding part 130, first surface 140, and second surface 150. Ferrule 110 is formed with a material that is optically transparent to wavelengths used for optical communications. Examples of the material of ferrule 110 include polyetherimide (PEI) such as ULTEM (registered trademark) and transparent resins such as cyclic olefin resin. In addition, ferrule 110 may be manufactured by injection molding. Ferrule 110 may be used for the purpose of transmission, reception, or transmission and reception.

Holding part 130 holds the end portion of optical transmission member 120. Holding part 130 includes first holding recess 131, at least one through hole 132, and a plurality of first grooves 133. Note that in the present embodiment, holding part 130 includes second holding recess 134 and pressing member 135 in addition to the above-mentioned configurations.

First holding recess 131 includes first surface 140 and third surface 136a facing first surface 140, and is open at the top surface of ferrule 110. The plan shape of first holding recess 131 is not limited as long as the end portions of the plurality of optical transmission members 120 can be disposed at appropriate positions. In the present embodiment, the plan shape of first holding recess 131 is rectangular. First surface 140 is disposed at one inner surface in the third direction (the Y direction) of first holding recess 131. Third surface 136a is disposed at the other inner surface in the third direction (the Y direction) of first holding recess 131. First holding recess 131, which is disposed between first surface 140 and third surface 136a, defines the extending direction of optical transmission member 120. Third surface 136a is a part of wall 136 where through hole 132 opens. In the present embodiment, first groove 133 and groove part 137 are disposed in the bottom surface of first holding recess 131.

Optical transmission member 120 is inserted to at least one through hole 132. Through hole 132 guides optical transmission member 120 to first groove 133 and prevents positional displacement with respect to first groove 133. Through hole 132 opens at first surface 140 and third surface 136a facing first surface 140 of first holding recess 131, and is disposed along the extending direction of optical transmission member 120 (the extending direction of first groove 133). That is, through hole 132 is disposed along the third direction (the Y direction). At least one through hole 132 is provided, and a plurality of through holes 132 may be provided. In the case where one through hole 132 is provided, through hole 132 may be a long hole, or may have a shape composed of a plurality of columnar through holes partially connected with each other. In the case where a plurality of through holes 132 is provided, the number of through holes 132 need only be greater than the number of optical transmission members 120 installed. In the present embodiment, the number of through holes 132 is the same as the number of optical transmission members 120. Specifically, in the present embodiment, the number of through holes 132 is 14.

Through hole 132 may be disposed such that its central axis is parallel to the rear surface of ferrule 110, or that it comes closer to the rear surface of ferrule 110 in the direction toward first surface 140. In the present embodiment, through hole 132 is disposed parallel to the rear surface of ferrule 110.

The size of through hole 132 is not limited as long as optical transmission member 120 can be inserted. Preferably, the minimum length of the opening of at least one through hole 132 is two or more times greater than the depth of first groove 133. In addition, preferably, the minimum length of the opening of at least one through hole 132 is greater than the diameter of optical transmission member 120. More specifically, preferably, the minimum length of the opening of at least one through hole 132 is 1.008 times or more greater than the diameter of optical transmission member 120. The shape of the opening of through hole 132 openning at third surface 136a and the shape of the opening of through hole 132 openning at fourth surface 136b are not limited as long as optical transmission member 120 can be inserted. The shape of the opening of through hole 132 openning at third surface 136a and the shape of the opening of through hole 132 openning at fourth surface 136b may be a circular shape, an elliptical shape, or a polygonal shape. In the present embodiment, the shape of the opening of through hole 132 openning at third surface 136a and the shape of the opening of through hole 132 openning at fourth surface 136b are each a circular shape. In addition, preferably, the minimum length of at least one through hole 132 in the XZ cross-section is two or more times greater than the depth of first groove 133. The shape of through hole 132 in the XZ cross-section is not limited as long as optical transmission member 120 can be inserted. The shape of through hole 132 in the XZ cross-section may be a circular shape, an elliptical shape, or a polygonal shape. In the present embodiment, the shape of through hole 132 in the XZ cross-section is a circular shape. In through hole 132, the size from the opening of through hole 132 openning at third surface 136a to the opening of through hole 132 openning at fourth surface 136b may be the same or differ. More specifically, for example, it may be disposed such that the size decreases from the opening on the back side (second holding recess 134 side) of ferrule 110 toward the opening on the front surface side (first holding recess 131 side) of ferrule 110. In addition, preferably, the plurality of (14) through holes 132 is disposed at respective positions corresponding to the plurality of first grooves 133.

The plurality of first grooves 133 is disposed along the extending direction of optical transmission member 120 in the bottom surface of first holding recess 131, and optical transmission member 120 inserted in through hole 132 is disposed thereto. First groove 133 may be disposed over the entire bottom surface of first holding recess 131, or in a part of the bottom surface of first holding recess 131. In the present embodiment, first groove 133 is disposed in a region of a part of the bottom surface of first holding recess 131 on first surface 140 side. The number of first grooves 133 need only be equal to or greater than the number of optical transmission members 120 installed. In the present embodiment, the number of first grooves 133 is the same as the number of optical transmission members 120. Specifically, in the present embodiment, the number of first grooves 133 is 14. The cross-sectional shape of first groove 133 in the XZ cross-section is not limited. First groove 133 may be a V-shaped groove, or a U-shaped groove. In the present embodiment, first groove 133 is a V-shaped groove. Here, "V-groove" refers to a groove composed of two planes with a v shape in the cross-section perpendicular to the extending direction of the groove. The connecting part of two planes may include another plane between two planes, or the connecting part of adjacent first grooves 133 may be connected by a curved surface. The "U-groove" refers to a groove composed of one curved surface with an arc shape in the cross-section perpendicular to the extending direction of the groove. Preferably, the depth of first groove 133 is a depth with which the upper end portion of optical transmission member 120 is located above the upper end portion of first groove 133 (ridge) in the state where optical transmission member 120 is disposed at first groove 133. In this manner, removal of optical transmission member 120 can be prevented by pressing optical transmission member 120 toward first groove 133 with pressing member 135.

First groove 133 may be disposed parallel to the rear surface of ferrule 110, or may be disposed such that it comes closer to the rear surface of ferrule 110 in the direction toward first surface 140. In the present embodiment, first groove 133 is disposed parallel to the rear surface of ferrule 110.

Figure 3A:
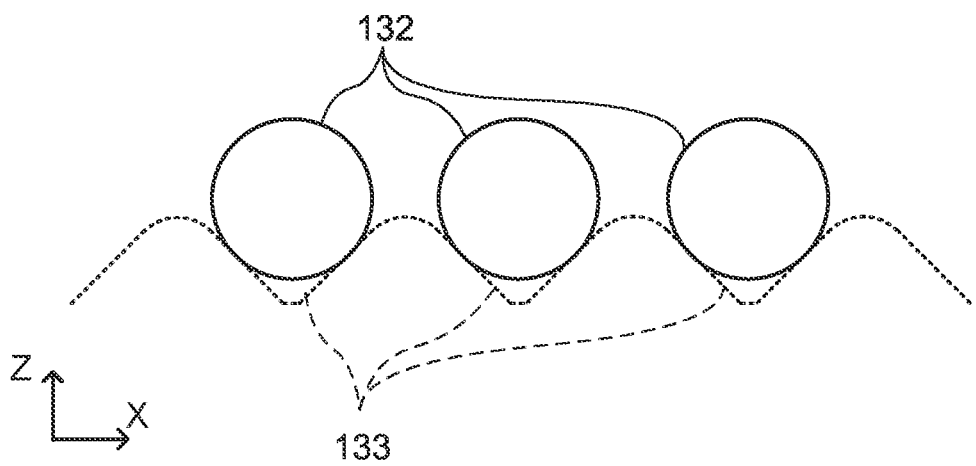
FIGS. 3A to 3C illustrate a positional relationship between a first groove and a through hole.
Figure 3B:
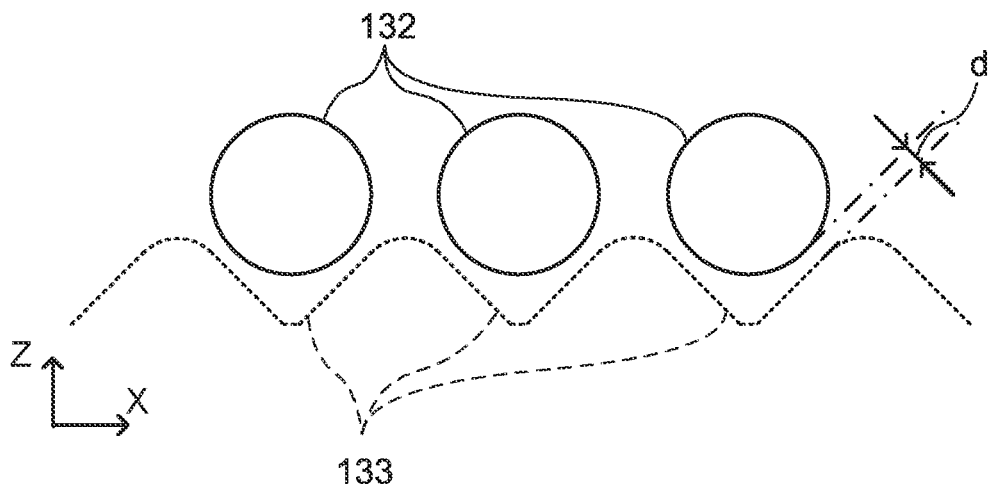
Figure 3C:
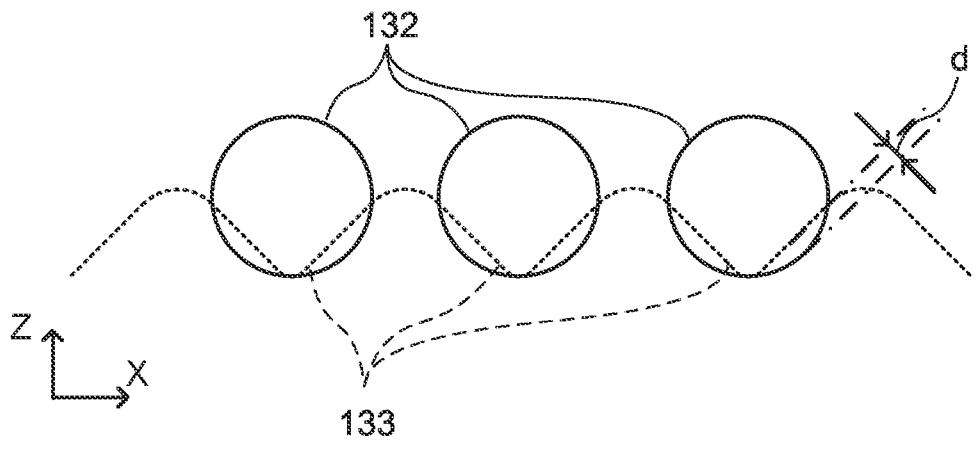
Figure 4A:
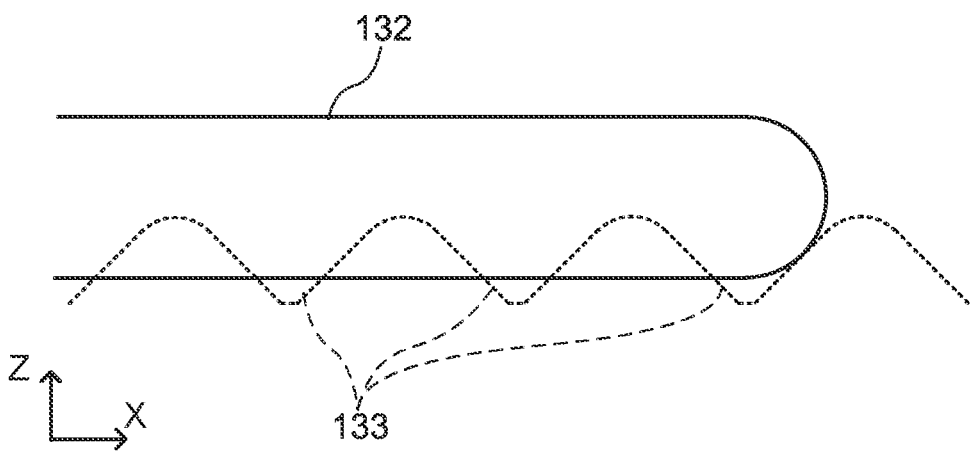
FIGS. 4A to 4C illustrate a positional relationship between the first groove and the through hole.
Figure 4B:
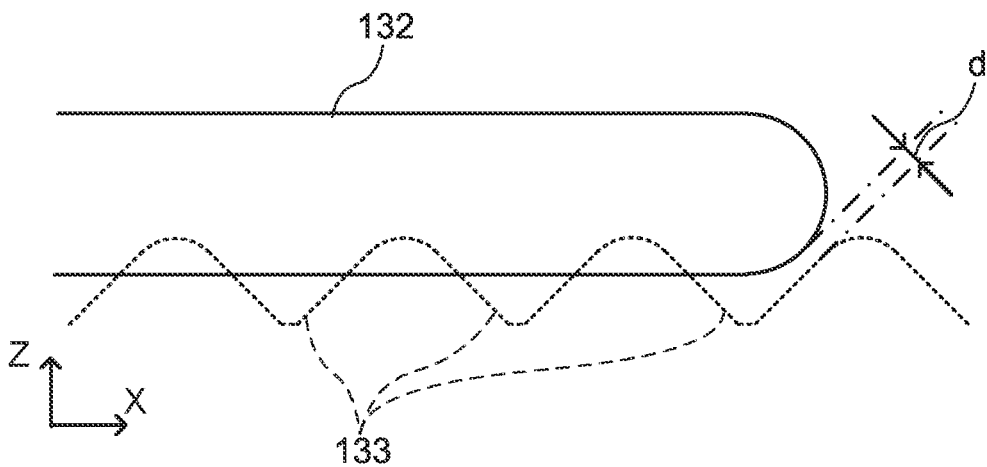
Figure 4C:
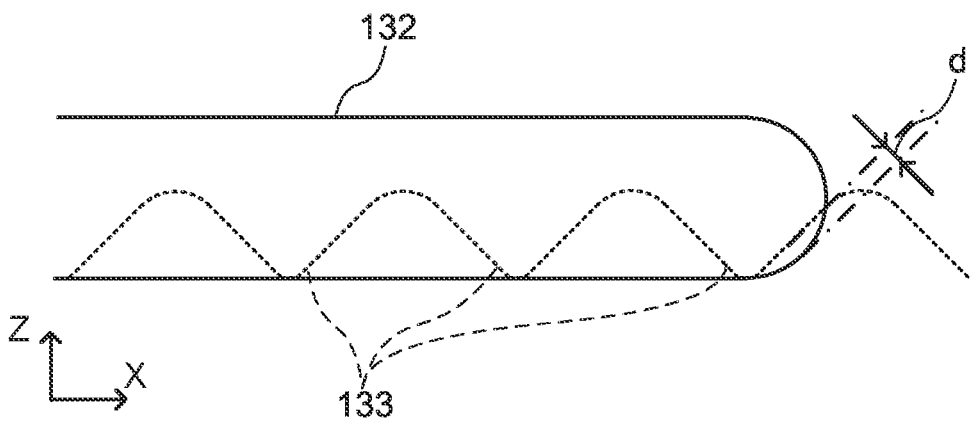
Figure 5A:
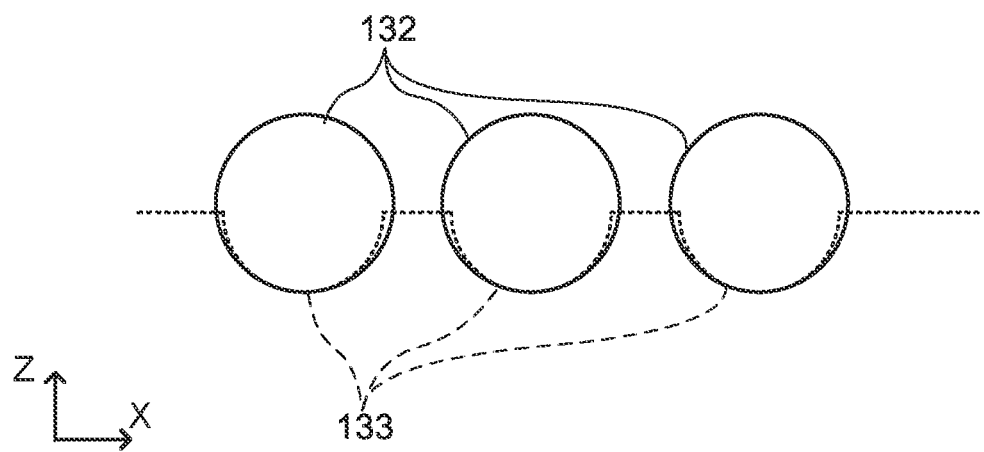
FIGS. 5A to 5C illustrate a positional relationship between the first groove and the through hole.
Figure 5B:
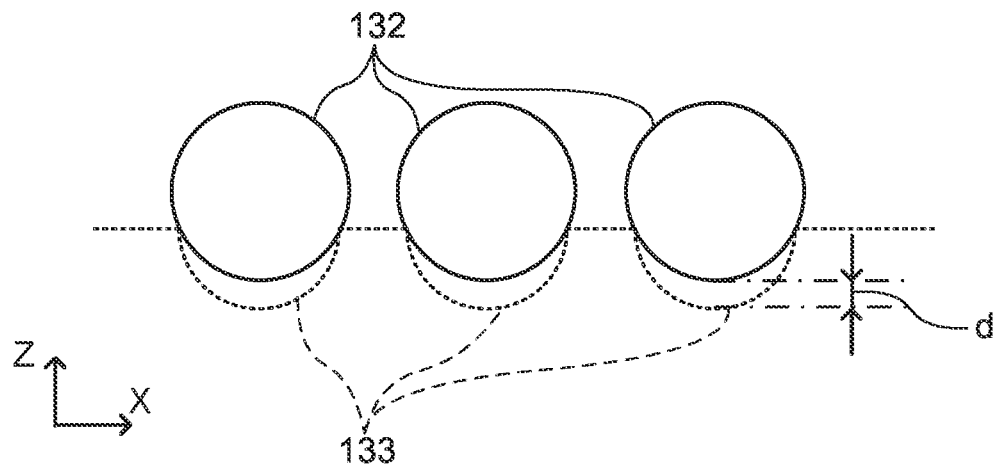
Figure 5C:
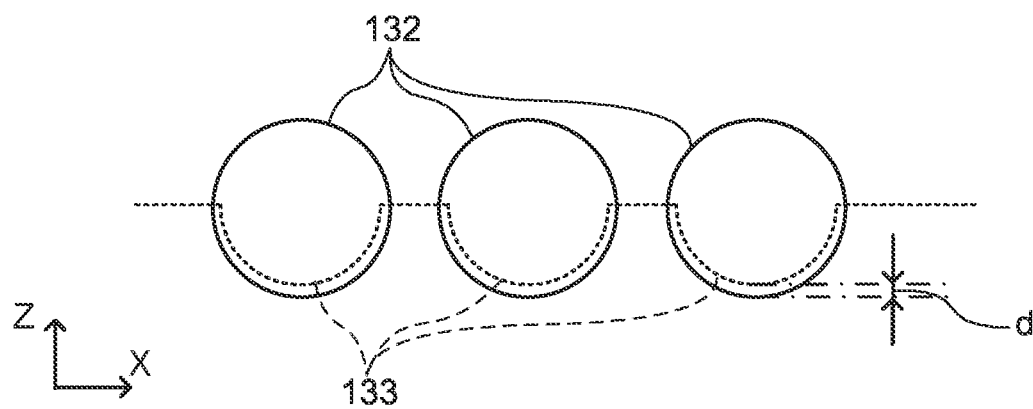

Here, a positional relationship between first groove 133 and through hole 132 is described. FIGS. 3A to 5C are schematic views illustrating a positional relationship between first groove 133 and through hole 132. FIGS. 3A to 3C illustrate a case where first groove 133 is a V-groove and through hole 132 is a plurality of through holes, FIGS. 4A to 4C illustrate a case where first groove 133 is a V-groove and through hole 132 is one long hole, and FIGS. 5A to 5C illustrate a case where through hole 132 is a plurality of through holes and first groove 133 is a U-shaped groove. In FIGS. 3A to 5C, through hole 132 is indicated with solid line, and first groove 133 is indicated with broken line.

FIGS. 3A, 4A and 5A illustrate a case where distance d is not provided between through hole 132 and first groove 133 as viewed along the extending direction of optical transmission member 120, and FIGS. 3B, 3C, 4B, 4C 5B and 5C illustrate a case where distance d is provided between through hole 132 and first groove 133 as viewed along the extending direction of optical transmission member 120.

As illustrated in FIGS. 3A to 3C and 5A to 5C, preferably, the position of the opening of through hole 132 on first holding recess 131 side and the position of first groove 133 in the first direction (the X direction) is disposed such that the center of the opening and the valley line of first groove 133 coincide with each other. Further, preferably, they are disposed such that optical transmission member 120 in through hole 132 and optical transmission member 120 on first groove 133 are located on the same straight line in the first direction (the X direction) (omitted in the drawing).

As illustrated in FIG. 3A, as viewed along the extending direction of optical transmission member 120, a part of through hole 132 and a part of first groove 133 may be in contact with each other. That is, as viewed along the extending direction of optical transmission member 120, no distance may be provided between through hole 132 and first groove 133.

As illustrated in FIG. 3B, as viewed along the extending direction of optical transmission member 120, a part of through hole 132 and a part of first groove 133 may be separated from each other. In the example illustrated in FIG. 3B, as viewed along the extending direction of optical transmission member 120, through hole 132 and first groove 133 do not overlap each other. In this case, preferably, the distance between through hole 132 and first groove 133 is 20 μm or smaller, more preferably 10 μm or smaller, still more preferably 5 μm or smaller as viewed along the extending direction of optical transmission member 120. The distance between through hole 132 and first groove 133 means the shortest distance between through hole 132 and first groove 133 as viewed along the extending direction of optical transmission member 120.

As illustrated in FIG. 3C, as viewed along the extending direction of optical transmission member 120, a part of through hole 132 and a part of first groove 133 may overlap each other. In this case, preferably, the distance between through hole 132 and first groove 133 is 20 μm or smaller, more preferably 10 μm or smaller, still more preferably 5 μm or smaller as viewed along the extending direction of optical transmission member 120. As illustrated in FIG. 3C, in the case where through hole 132 overlaps first groove 133 as viewed along the extending direction of optical transmission member 120, the inserted optical transmission member may hit the groove, and the ferrule may possibly be scraped. In view of this, in the case where through hole 132 and first groove 133 are not in contact with each other, it is preferable that through hole 132 do not overlap first groove 133 as illustrated in FIG. 3B.

As described above, when the distance between through hole 132 and first groove 133 is 20 μm or smaller, optical transmission members 120 inserted from respective through holes 132 can be guided to corresponding first grooves 133. Preferably, the distance between through hole 132 and first groove 133 is 0 mm, i.e., through hole 132 and first groove 133 are in contact with each other as viewed along the extending direction of optical transmission member 120.

As illustrated in FIGS. 4A to 4C, in the case where through hole 132 is a single long hole, a part of through hole 132 and a part of first groove 133 may be or may not be in contact with each other as viewed along the extending direction of optical transmission member 120. Also in this case, preferably, the distance between through hole 132 and first groove 133 is 20 μm or smaller, more preferably 10 μm or smaller, still more preferably 5 μm or smaller as viewed along the extending direction of optical transmission member 120.

As illustrated in FIG. 5A, as viewed along the extending direction of optical transmission member 120, a part of through hole 132 and a part of first groove 133 may be in contact with each other. Here, a state where first groove 133 and through hole 132 are in contact with each other means a state where the bottom portion of first groove 133 and the bottom portion of through hole 132 are in contact with each other. In this case, the opening of first groove 133 overlaps through hole 132.

As illustrated in FIG. 5B, as viewed along the extending direction of optical transmission member 120, a part of through hole 132 and a part (opening) of first groove 133 are in contact with each other.

As illustrated in FIG. 5C, as viewed along the extending direction of optical transmission member 120, a part of through hole 132 and a part of first groove 133 may overlap each other. In the example illustrated in FIG. 5C, as viewed along the extending direction of optical transmission member 120, through hole 132 and the bottom portion and the opening of first groove 133 overlap each other. In this case, preferably, the distance between through hole 132 and first groove 133 is 20 μm or smaller, more preferably 10 μm or smaller, still more preferably 5 μm or smaller as viewed along the extending direction of optical transmission member 120.

In this manner, when the distance between through hole 132 and first groove 133 is 20 μm or smaller as viewed along the extending direction of optical transmission member 120, optical transmission member 120 inserted to through hole 132 does not make contact with first groove 133.

Note that in the present embodiment, groove part 137 with a depth greater than the depth of first groove 133 is disposed between first groove 133 and through hole 132. Groove part 137 extends in the first direction (the X direction). In this case, preferably, the bottom portion of through hole 132 is located above the bottom portion of first groove 133 as illustrated in FIGS. 3A, 4A and 5C.

Second holding recess 134 includes fourth surface 136b, and is disposed such that wall 136 is located between it and first holding recess 131. Second holding recess 134 is open at the back surface and the top surface of ferrule 110. The plan shape of second holding recess 134 is not limited as long as the plurality of optical transmission members 120 can be installed. In the present embodiment, the plan shape of second holding recess 134 is a rectangular shape. Second holding recess 134 defines the end portion in the extending direction of optical transmission member 120 on the back side of ferrule 110 than fourth surface 136a. Through hole 132 opens at fourth surface 136b on one side (front surface side of ferrule 110) of second holding recess 134 in the third direction (the Y direction), and the other side thereof (the back side of ferrule 110) is open.

Pressing member 135 presses optical transmission member 120 toward first groove 133. In other words, pressing member 135 presses optical transmission member 120 toward a connector main body including first surface 140, second surface 150, first holding recess 131 and through hole 132. Pressing member 135 is housed in first holding recess 131 where the end portion of optical transmission member 120 is disposed, and fixed with an adhesive and the like.

First surface 140 is disposed to face the end surfaces of the plurality of optical transmission members 120 held at holding part 130. First surface 140 allows incidence of light emitted from the plurality of optical transmission members 120. Note that first surface 140 may emit, toward the end surfaces of the plurality of optical transmission members 120, light entered from second surface 150. The shape of first surface 140 is not limited as long as the above-mentioned function can be ensured. First surface 140 may include a plurality of projecting surfaces or may be a flat surface. In the present embodiment, first surface 140 is a flat surface. First surface 140 is disposed at a part of the inner surface in the third direction (the Y direction) of first holding recess 131.

The surface of first surface 140 that makes contact with the end surface of optical transmission member 120 may be tilted such that it comes closer to second surface 150 in the direction toward the rear surface of ferrule 110, or may be perpendicular to the rear surface of ferrule 110. In the present embodiment, the surface of first surface 140 that makes contact with the end surface of optical transmission member 120 is disposed such that it comes closer to second surface 150 in the direction toward the rear surface of ferrule 110. Preferably, the inclination angle of first surface 140 is the same as the inclination angle of the end surface of optical transmission member 120. Preferably, the inclination angle of first surface 140 with respect to the second direction (the Z direction) set as 0 degree is 3 to 8 degrees, more preferably 5 to 8 degrees, for example. In the present embodiment, the inclination angle of first surface 140 with respect to the second direction (the Z direction) set as 0 degree is 5 degrees.

Second surface 150 emits, to the outside, the light entered from first surface 140. Note that second surface 150 may allow incidence of light from the outside. The shape of second surface 150 is not limited as long as the above-mentioned function can be ensured. Second surface 150 may include a plurality of projecting surfaces or may be a flat surface. In the present embodiment, second surface 150 includes a plurality of projecting surfaces (optical control surfaces) 151. Projecting surfaces 151, disposed in parallel in the first direction (the X direction), emit, toward another ferrule 110, the light entered from first surface 140, or allow incidence of light from the outside. Second surface 150 is disposed at the front surface of ferrule 110. The plan shape of projecting surface 151 is not limited. The plan shape of projecting surface 151 may be a circular shape or a rectangular shape. In the present embodiment, the plan shape of projecting surface 151 is a circular shape. In addition, the number of projecting surfaces 151 is the same as the number of optical transmission members 120. Specifically, in the present embodiment, the number of projecting surface 151 is 14.

Now, a method of attaching optical transmission member 120 to ferrule 110 is described. First, the plurality of optical transmission members 120 is inserted to through hole 132 from the opening of fourth surface 136b of ferrule 110. Next, optical transmission members 120 inserted to through hole 132 are disposed on respective first grooves 133, the end surfaces of the plurality of optical transmission members 120 is brought into contact with first surface 140. In this state, adhesive is applied to the front end portion of optical transmission member 120 in contact with first surface 140. Next, pressing member 135 is housed in first holding recess 131 in such a manner as to press optical transmission member 120 toward first groove 133. Finally, adhesive is cured to fix optical transmission member 120 to ferrule 110. In this manner, through hole 132 serves as a guide for placing optical transmission member 120, and thus each optical transmission member 120 can be appropriately installed to each first groove 133.

Effects

In the above-mentioned manner, according to the present embodiment, ferrule 110 includes through hole 132 and first groove 133, and thus the plurality of optical transmission members 120 can be easily appropriately installed to ferrule 110. Thus, the front end of optical transmission member 120 can be accurately positioned and it can be can be easily assembled.

Embodiment 2

Next, optical connector 200 according to Embodiment 2 is described. Optical connector 200 according to the present embodiment is different from optical connector 100 according to Embodiment 1 only in ferrule 210. The components similar to those of optical connector 100 according to Embodiment 1 are denoted with the same reference numerals and the description thereof is omitted.

Configuration of Optical Connector

Figure 6:
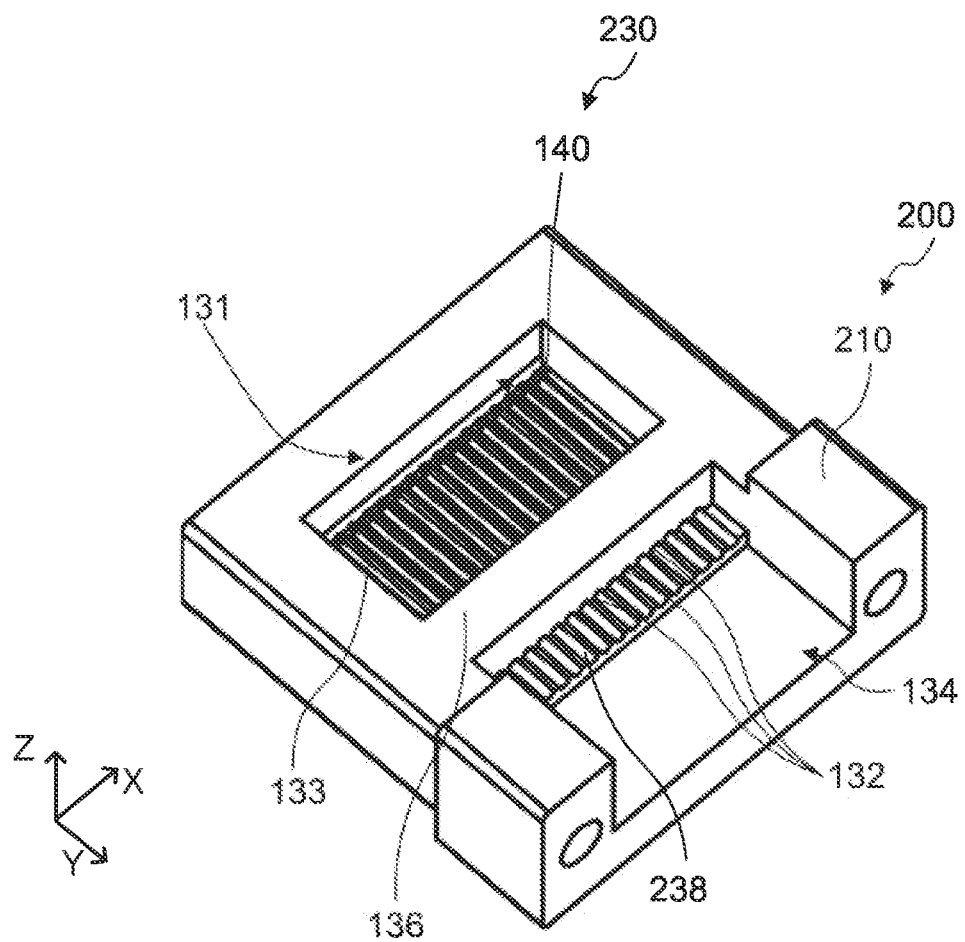
FIG. 6 is a perspective view of an optical connector according to Embodiment 2 of the present invention.
Figure 7A:
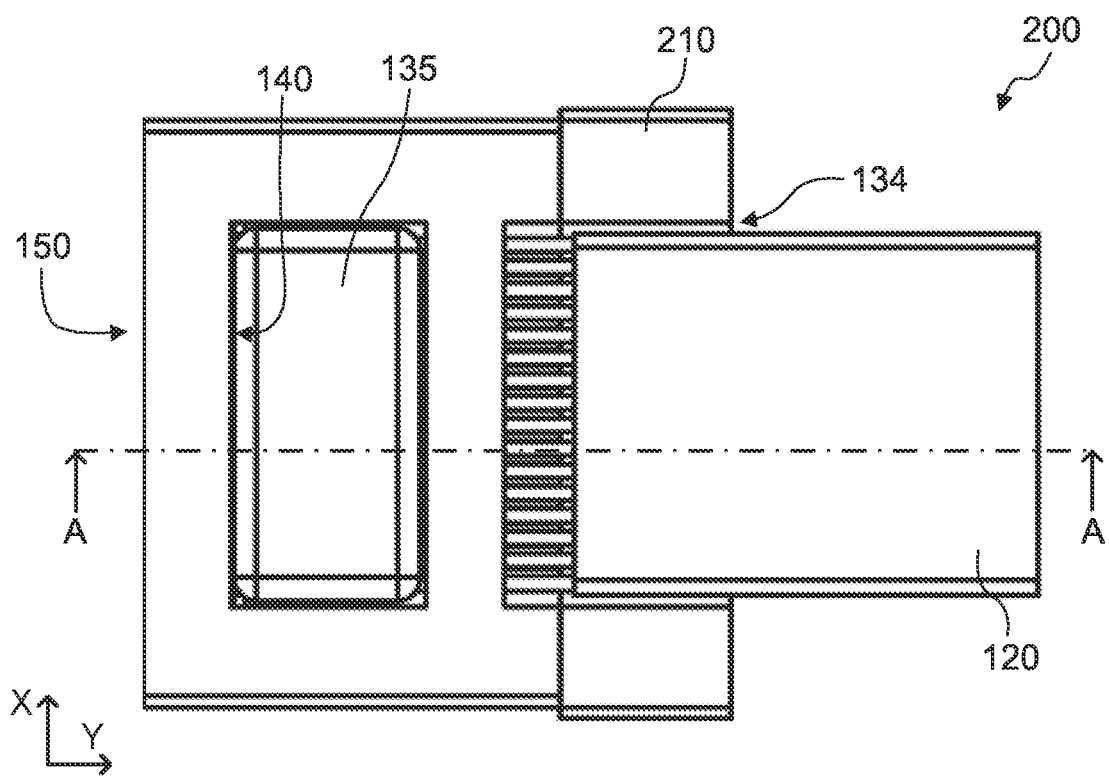
FIGS. 7A and 7B illustrate a configuration of an optical connector according to Embodiment 2 of the present invention.
Figure 7B:
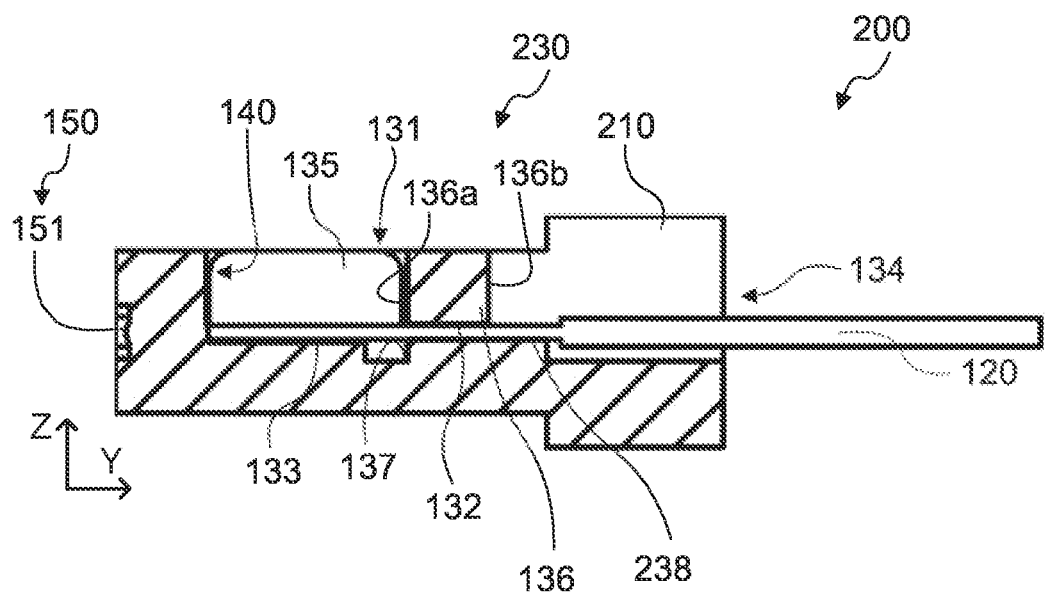

FIG. 6 is a perspective view of optical connector 200 according to Embodiment 2 of the present invention. FIG. 7A is a plan view of optical connector 200, and FIG. 7B is a sectional view taken along line A-A illustrated in FIG. 7A. Note that pressing member 135 and optical transmission member 120 are omitted in FIG. 6, and optical transmission member 120 is indicated with solid line in FIGS. 7A and 7B.

As illustrated in FIGS. 6, 7A and 7B, optical connector 200 according to Embodiment 2 includes ferrule 210 and optical transmission member 120.

Ferrule 210 includes holding part 230, first surface 140, second surface 150, second holding recess 134, pressing member 135, and a plurality of second grooves 238.

The plurality of second grooves 238 is disposed at second holding recess 134 along the extending direction of optical transmission member 120 in a manner corresponding to at least one through hole 132. Second groove 238 guides optical transmission member 120 to first groove 133. Second groove 238 may be disposed in the entire bottom surface of second holding recess 134, or in a part of the bottom surface of second holding recess 134. In the present embodiment, second groove 238 is disposed in the region of a part of the bottom surface of second holding recess 134 on fourth surface 136b side. In addition, in the present embodiment, second groove 238 is disposed in contact with wall 136 (fourth surface 136b). A plurality of second grooves 238 is provided, and the number of second grooves 238 need only be equal to or greater than the number of optical transmission members 120 installed. In the present embodiment, the number of second grooves 238 is the same as the number of first grooves 133 and the number of through holes 132. Specifically, the number of second groove 238 is 14.

Preferably, the width of second groove 238 is greater than the minimum length of the opening of through hole 132. The cross-sectional shape of second groove 238 in the XZ cross-section is not limited. Second groove 238 may be a V-shaped groove, or a U-shaped groove. In the present embodiment, second groove 238 is a U-shaped groove, and its cross-sectional shape is a semicircular shape. The depth of second groove 238 is not limited as long as optical transmission member 120 can be guided to through hole 132. In the present embodiment, the depth of second groove 238 is the same as the radius of through hole 132. In this manner, no step is formed at the boundary between the bottom portion of second groove 238 and through hole 132, and thus optical transmission member 120 can be appropriately guided to through hole 132.

Preferably, the position of the opening of through hole 132 on second holding recess 134 side and the position of second groove 238 in the second direction (the Z direction) are set such that the center of the opening and the bottom portion of second groove 238 coincide with each other. Preferably, they are disposed such that optical transmission member 120 in through hole 132 and optical transmission member 120 on second groove 238 are located on the same straight line in the second direction (the Z direction).

In the present embodiment, to attach optical transmission member 120 to ferrule 210, first, each optical transmission member 120 is guided to each through hole 132 with second groove 238 as a guide. Next, the plurality of optical transmission members 120 is inserted to through hole 132 from the opening of fourth surface 136b of ferrule 210. Next, optical transmission members 120 inserted to through hole 132 are disposed on respective first grooves 133, and the end surfaces of the plurality of optical transmission members 120 are brought into contact with first surface 140. In this state, adhesive is applied to the front end portion of optical transmission member 120 in contact with first surface 140. Next, pressing member 135 is housed in first holding recess 131 in such a manner as to press optical transmission member 120 against first groove 133. Finally, the adhesive is cured to fix optical transmission member 120 to ferrule 110. In this manner, through hole 132 functions as a guide for placing optical transmission member 120, and thus each optical transmission member 120 can be appropriately installed to each first groove 133.

Effects

In the above-mentioned manner, according to the present embodiment, second groove 238 is further provided, and thus it can be further easily assembled in comparison with optical connector 100 according to Embodiment 1.

Reference Example

Next, optical connector 500 according to a reference example is described. Optical connector 500 according to the reference example is the same as optical connector 200 according to Embodiment 2 except that wall 136 is not provided. Therefore, the components similar to optical connector 200 according to Embodiment 2 are denoted with the same reference numerals, and the description thereof is omitted.

Configuration of Optical Connector

Figure 8:
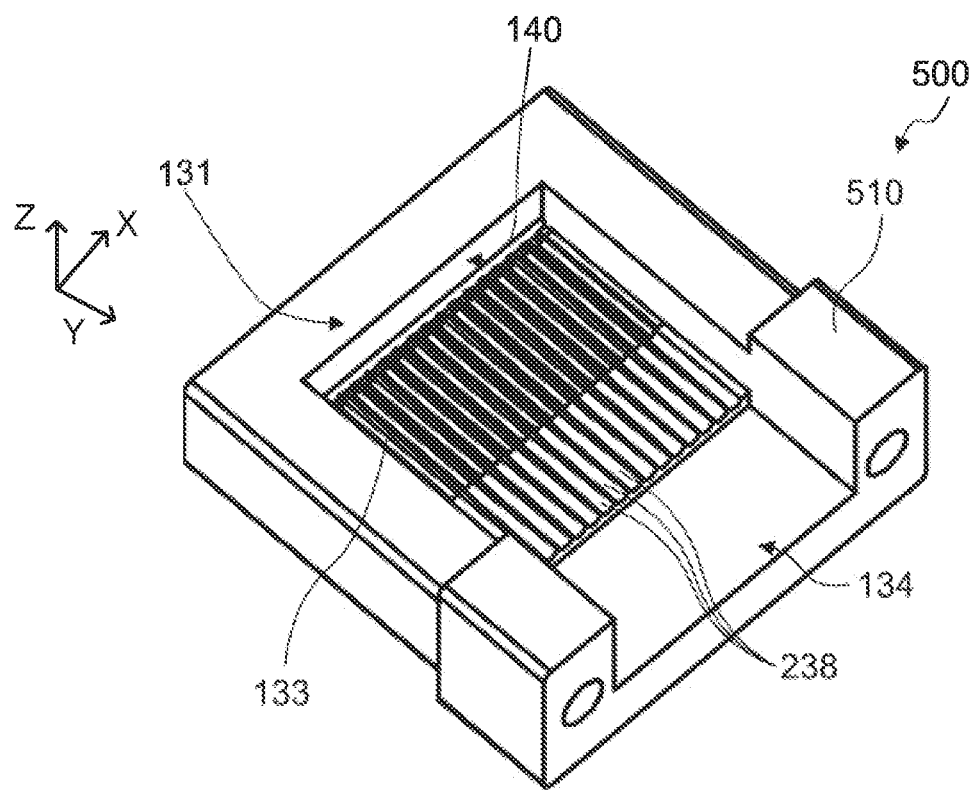
FIG. 8 is a perspective view of an optical connector according to a reference example.
Figure 9A:
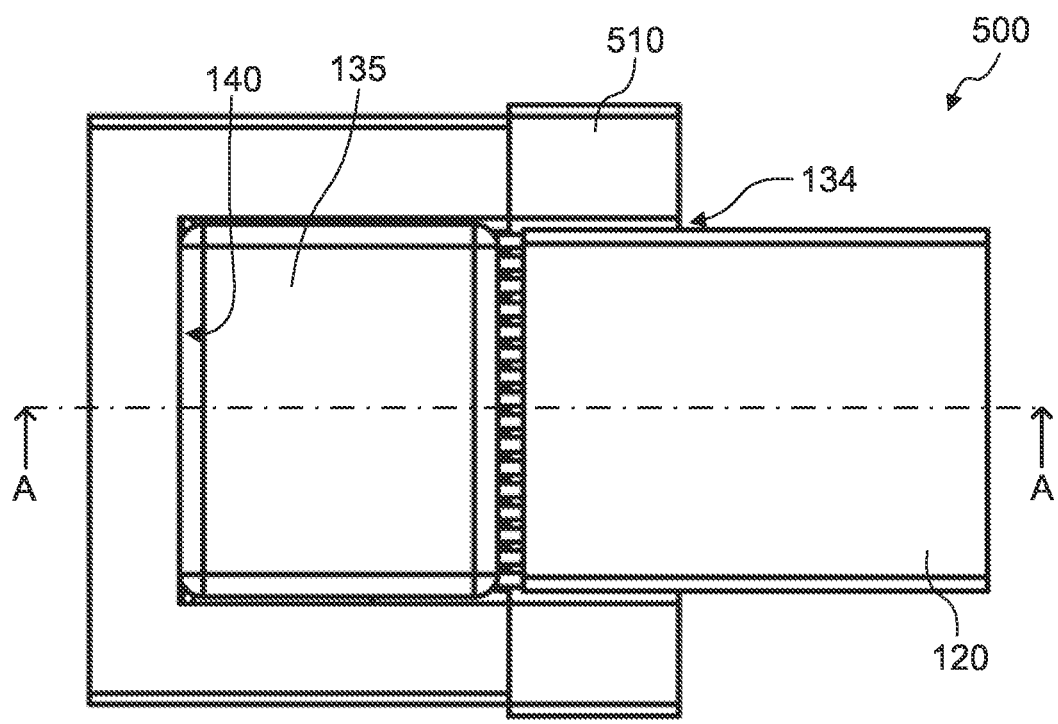
FIGS. 9A and 9B illustrate a configuration of an optical connector according to a reference example.
Figure 9B:
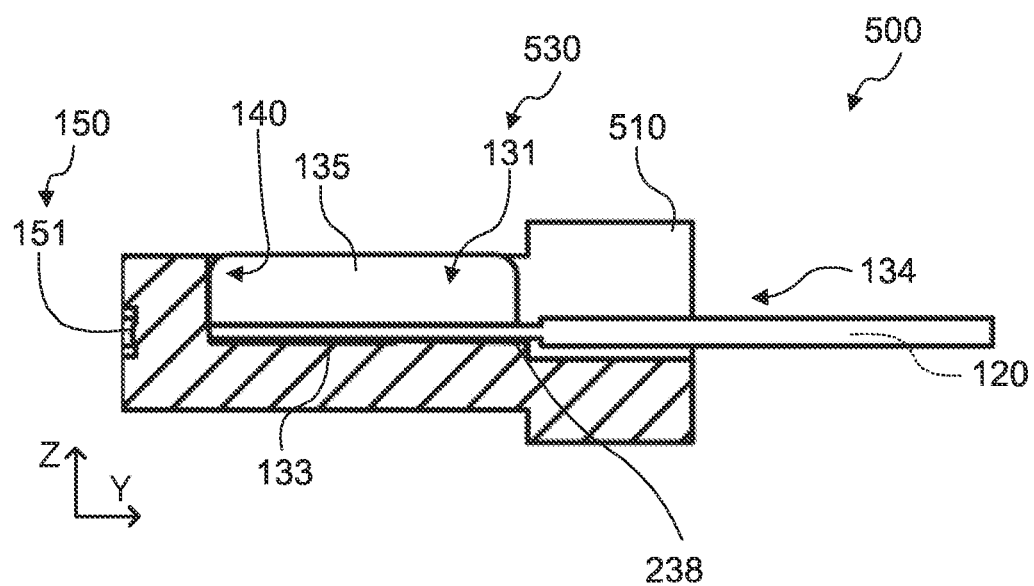

FIG. 8 is a perspective view of optical connector 500 according to the reference example. FIG. 9A is a plan view of optical connector 100, and FIG. 9B is a sectional view taken along line A-A illustrated in FIG. 9A. Note that pressing member 135 and optical transmission member 120 are omitted in FIG. 8, and optical transmission member 120 is indicated with solid line in FIGS. 9A and 9B.

As illustrated in FIGS. 8, 9A and 9B, optical connector 500 according to the reference example includes ferrule 510 and optical transmission member 120.

Ferrule 510 includes holding part 530, first surface 140, second surface 150, second holding recess 134, pressing member 135, and the plurality of second grooves 238.

Effects

According to the reference example, since second groove 238 is provided, each optical transmission member 120 can be easily disposed to each first groove 133. In addition, since no through hole 132 is provided, the assembly accuracy is lower than in Embodiments 1 and 2.

Industrial Applicability

The ferrule, optical connector and optical connector module according to the present invention are suitable for optical communications using optical transmission members.

Industrial Applicability 100, 200, 500 Optical connector
110, 210, 510 Ferrule
120 Optical transmission member
130, 230, 530 Holding part
131 First holding recess
132 Through hole
133 First groove
134 Second holding recess
135 Pressing member
136 Wall
136a Third surface
136b Fourth surface
137 Groove part
238 Second groove
140 First surface
150 Second surface

What is claimed is:

1. A ferrule configured to hold a plurality of optical transmission members, the ferrule comprising:
    a holding part configured to hold one end portion of the plurality of optical transmission members;
    a first surface configured to allow, to enter the ferrule, light emitted from the plurality of optical transmission members held by the holding part, or configured to emit, toward the plurality of optical transmission members, light advanced inside the ferrule; and
    a second surface configured to emit, to outside of the ferrule, the light advanced inside the ferrule, or configured to allow, to enter the ferrule, light from the outside,
    wherein the holding part includes:
        a first holding recess including the first surface and a third surface facing the first surface,
        at least one through hole that is open at the third surface and a fourth surface, the fourth surface being located on a side on which the plurality of optical transmission members is inserted, and
        a plurality of first grooves disposed at the first holding recess along an extending direction of the plurality of optical transmission members, the plurality of optical transmission members inserted to the at least one through hole is respectively disposed at the plurality of first grooves,
        a second holding recess including the fourth surface, and
        a plurality of second grooves disposed at the second holding recess along the extending direction of the plurality of optical transmission members in a manner corresponding to the plurality of first grooves, the plurality of second grooves contacting with the fourth surface.

2. The ferrule according to claim 1, wherein the second surface includes a plurality of optical control surfaces configured to emit, to the outside of the ferrule, light emitted from the plurality of optical transmission members and advanced inside the ferrule, or configured to allow, to enter the ferrule, the light from the outside.

3. The ferrule according to claim 1, wherein a minimum length of an opening of the at least one through hole is two or more times greater than a depth of the plurality of first groove.

4. The ferrule according to claim 1, wherein a minimum length of an opening of the at least one through hole is greater than a diameter of the plurality of optical transmission members.

5. The ferrule according to claim 1, wherein:
    the at least one through hole includes a plurality of through holes; and
    the plurality of through holes is respectively disposed at positions corresponding to the plurality of first grooves.

6. The ferrule according to claim 5, wherein as viewed along the extending direction of the plurality of optical transmission members, a distance between each of the plurality of through holes and each of the plurality of first grooves is 20 µm or smaller.

7. The ferrule according to claim 1, further comprising a pressing member configured to press, toward the plurality of first grooves, the plurality of optical transmission members disposed on the plurality of first grooves.

8. An optical connector, comprising:
    the ferrule according to claim 1; and
    a plurality of optical transmission members held by the ferrule.

9. An optical connector module, comprising the optical connector according to claim 8.

* * * * *